(12) United States Patent
Li et al.

(10) Patent No.: US 8,363,846 B1
(45) Date of Patent: Jan. 29, 2013

(54) FREQUENCY DOMAIN SIGNAL PROCESSOR FOR CLOSE TALKING DIFFERENTIAL MICROPHONE ARRAY

(75) Inventors: Yunhong Li, Santa Clara, CA (US); Lin Sun, Sunnyvale, CA (US); Wei Ma, San Ramon, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1221 days.

(21) Appl. No.: 11/684,076

(22) Filed: Mar. 9, 2007

(51) Int. Cl.
*H04R 3/00* (2006.01)

(52) U.S. Cl. .......................... 381/92; 381/111; 381/113

(58) Field of Classification Search .............. 381/91–92, 381/94.1–94.3, 94.7, 122, 111, 113
See application file for complete search history.

(56) References Cited

U.S. PATENT DOCUMENTS

| | | | | |
|---|---|---|---|---|
| 5,581,620 | A * | 12/1996 | Brandstein et al. ............. | 381/92 |
| 7,277,550 | B1 * | 10/2007 | Avendano et al. ........... | 381/94.2 |
| 7,672,466 | B2 * | 3/2010 | Yamada et al. ............. | 381/94.7 |
| 7,864,969 | B1 * | 1/2011 | Ma et al. ......................... | 381/92 |
| 2001/0033583 | A1 | 10/2001 | Rabenko et al. | |
| 2003/0147538 | A1 * | 8/2003 | Elko ............................... | 381/92 |
| 2006/0013412 | A1 | 1/2006 | Goldin | |
| 2008/0232606 | A1 * | 9/2008 | Holloway et al. ............ | 381/71.8 |

OTHER PUBLICATIONS

IEEE, New York, "Discrete-Time Processing of Speech Signals", John R. Deller, Jr., et al., copyright 2000, 6 pages.

Acoustic Laboratory Massachusetts Intstitue of Technology, Bolt Bernaek and Newman, Inc., "Acoustics", Leo L. Beranek, 1957 Edition, 5 pages.
IEEE, "Acoustic Noise Reduction for Speech Communication (Second-Order Gradient Microphone)", George S. Kang, et al., copyright 1999, pp. IV-556-IV-559.
IEEE, "Second-Order Gradient Noise-Cancelling Microphone", Austin J. Brouns, copyright 1981, pp. 786-789.
IEEE, "An Adaptive Close-Talking Microphone Array", Heinz Teutsch, et al., copyright Oct. 2001, pp. 163-166.
International Search Report for PCT/US08/56007, dated Jul. 25, 2008.
Written Opinion of the International Search Report for PCT/US08/56007, dated Jul. 25, 2008.
U.S. Appl. No. 11/688,437, entitled Synchronous Detection and Calibration System and Method for Differential Acoustic Sensors, filed Mar. 20, 2007, 20 pages.

* cited by examiner

*Primary Examiner* — Disler Paul
(74) *Attorney, Agent, or Firm* — Andrew S. Viger; Wade J. Brady, III; Frederick J. Telecky, Jr.

(57) ABSTRACT

A system and method for processing close talking differential microphone array (CTDMA) signals in which incoming microphone signals are transformed from time domain signals to frequency domain signals having separable magnitude and phase information. Processing of the frequency domain signals is performed using the magnitude information, following which phase information is reintroduced using phase information of one of the original frequency domain signals. As a result, high pass filtering effects of conventional differential signal processing of CTDMA signals are substantially avoided.

18 Claims, 3 Drawing Sheets

FREQUENCY DOMAIN SIGNAL PROCESSOR FOR CLOSE TALKING DIFFERENTIAL MICROPHONE ARRAY

BACKGROUND OF THE INVENTION

1. Field of the Invention

The present invention relates to microphone arrays and in particular, to filtering and processing circuits for differential microphone arrays.

2. Description of the Related Art

With the seemingly ever increasing popularity of cellular telephones, as well as personal digital assistances (PDAs) providing voice recording capability, it has become increasingly important to have noise canceling microphones capable of operating in noisy acoustic environments. Further, even in the absence of excessive background noise, noise canceling microphones are nonetheless highly desirable for certain applications, such as speech recognition devices and high fidelity microphones for studio and live performance uses.

Such microphones are often referred to as pressure gradient or first order differential (FOD) microphones, and have a diaphragm which vibrates in accordance with differences in sound pressure between its front and rear surfaces. This allows such a microphone to discriminate against airborne and solid-borne sounds based upon the direction from which such noise is received relative to a reference axis of the microphone. Additionally, such a microphone can distinguish between sound originating close to and more distant from the microphone.

For the aforementioned applications, so called close-talk microphones, i.e., microphones which are positioned as close to the mouth of the speaker as possible, are seeing increasing use. In particular, multiple microphones are increasingly configured in the form of a close-talking differential microphone array (CTDMA), which inherently provide low frequency far field noise attenuation. Accordingly, a CTDMA advantageously cancels far field noise, while effectively accentuating the voice of the close talker, thereby spatially enhancing speech quality while minimizing background noise. (Further discussion of these types of microphones can be found in U.S. Pat. Nos. 5,473,684, and 5,586,191, the disclosures of which are incorporated herein by reference.)

While a CTDMA generally works well for its intended purpose, its differential connection, i.e., where one microphone signal is subtracted from another, will typically boost the internal noise. The action of the differential summing, i.e., signal subtraction, generally increases, e.g., doubles, the internal noise. Additionally, following this differential summation, the signal needs to be amplified, e.g., 10-20 decibels, which also increases the internal circuit noise.

SUMMARY OF THE INVENTION

In accordance with the presently claimed invention, a system and method are provided for processing close talking differential microphone array (CTDMA) signals in which incoming microphone signals are transformed from time domain signals to frequency domain signals having separable magnitude and phase information. Processing of the frequency domain signals is performed using the magnitude information, following which phase information is reintroduced using phase information of one of the original frequency domain signals. As a result, high pass filtering effects of conventional differential signal processing of CTDMA signals are substantially avoided.

In accordance with one embodiment of the presently claimed invention, a frequency domain signal processor for a CTDMA includes:

time-to-frequency domain conversion circuitry responsive to a plurality of time domain microphone signals with respective magnitudes and phases by providing a corresponding plurality of frequency domain microphone signals with respective magnitudes and phases and originating from a corresponding plurality of microphones;

filter and processing circuitry coupled to the time-to-frequency domain conversion circuitry and responsive to the plurality of frequency domain microphone signals by providing a frequency domain processed signal related to a combination of the plurality of frequency domain microphone signal magnitudes;

phase recovery circuitry coupled to the time-to-frequency domain conversion circuitry and the filter and processing circuitry, and responsive to at least one of the plurality of frequency domain microphone signals and the frequency domain processed signal by providing a frequency domain resultant signal having a phase related to the at least one of the plurality of frequency domain microphone signals; and frequency-to-time domain conversion circuitry coupled to the phase recovery circuitry and responsive to the frequency domain resultant signal by providing a corresponding time domain resultant signal related to a combination of the plurality of time domain microphone signals.

In accordance with another embodiment of the presently claimed invention, a frequency domain signal processor for a CTDMA includes:

time-to-frequency domain converter means for responding to a plurality of time domain microphone signals with respective magnitudes and phases by providing a corresponding plurality of frequency domain microphone signals with respective magnitudes and phases;

filter and processor means for responding to the plurality of frequency domain microphone signals by providing a frequency domain processed signal related to a combination of the plurality of frequency domain microphone signal magnitudes;

phase recovery means for responding to at least one of the plurality of frequency domain microphone signals and the frequency domain processed signal by providing a frequency domain resultant signal having a phase related to the at least one of the plurality of frequency domain microphone signals; and frequency-to-time domain converter means for responding to the frequency domain resultant signal by providing a corresponding time domain resultant signal related to a combination of the plurality of time domain microphone signals.

In accordance with another embodiment of the presently claimed invention, a method for processing CTDMA signals in the frequency domain includes:

converting a plurality of time domain microphone signals with respective magnitudes and phases to a corresponding plurality of frequency domain microphone signals with respective magnitudes and phases;

filtering and processing the plurality of frequency domain microphone signals to provide a frequency domain processed signal related to a combination of the plurality of frequency domain microphone signal magnitudes;

combining at least one of the plurality of frequency domain microphone signals and the frequency domain processed signal to provide a frequency domain resultant signal having a phase related to the at least one of the plurality of frequency domain microphone signals; and converting the frequency domain resultant signal to a corresponding time domain resultant signal related to a combination of the plurality of time domain microphone signals.

DETAILED DESCRIPTION

Figure 1:
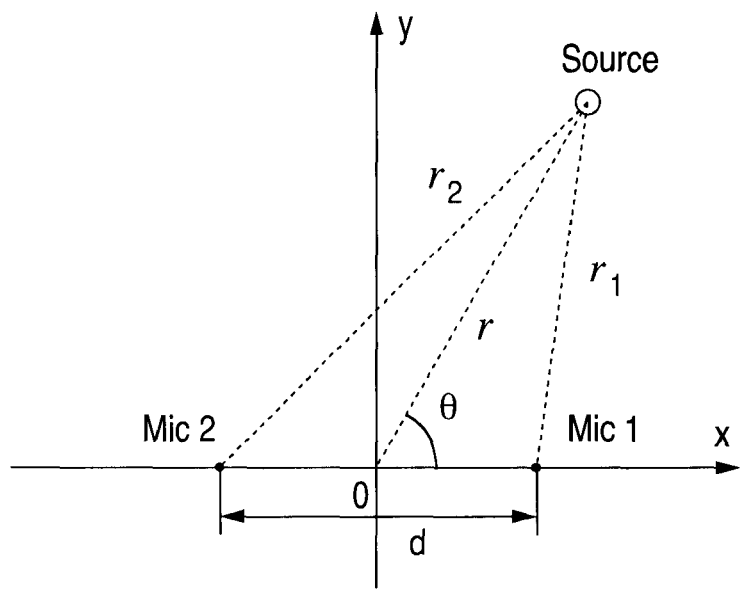
FIG. 1 illustrates the geometry of a FOD microphone array.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

In a conventional CTDMA design, the output is formed by the difference of the signals received in two closely placed microphones. Through the differential operation, far-field noise is attenuated while the desirable signal in the near-field receives less attenuation, thereby producing an overall signal-to-noise ratio (SNR) improvement.

A conventional CTDMA is known to have a high pass effect on its output because the differential operation is equivalent to a high pass filter in the audible frequency range with the frequency response changing dynamically with the location of the near-field source. The fact that the near-field source generally cannot be treated as a point source further complicates the frequency response. A deterministic low pass filter can partially compensate for such low frequency loss but is inadequate to restore the original near-field signal frequency distribution. Others have proposed to dynamically estimate the location of the near-field source and then use that information to design an adaptive low pass filter to restore the output. However, such an estimation is not a trivial task for reliable implementation. Moreover, its accuracy decreases when far-field noise level is high.

The high pass effect of a conventional CTDMA also limits the SNR improvement which is inversely proportional to frequency in the range up to 3-4 kHz. For signals at higher frequencies, the SNR decreases. Thus a conventional CTDMA is generally limited to speech application below 4 kHz. Another issue is that phase mismatches among the microphones are larger at high frequencies, thereby further reducing potential SNR improvements.

Referring to FIG. 1, using a wave propagation model, the output voltage V(f) of a conventional FOD microphone array as a function of frequency can be written as $$V(f) = \frac{e^{-jkr_1}}{r_1} - \frac{e^{-jkr_2}}{r_2} \qquad (1)$$

where $k=2\pi/\lambda$ is the wave number with $\lambda$ being the wavelength.

Figure 2:
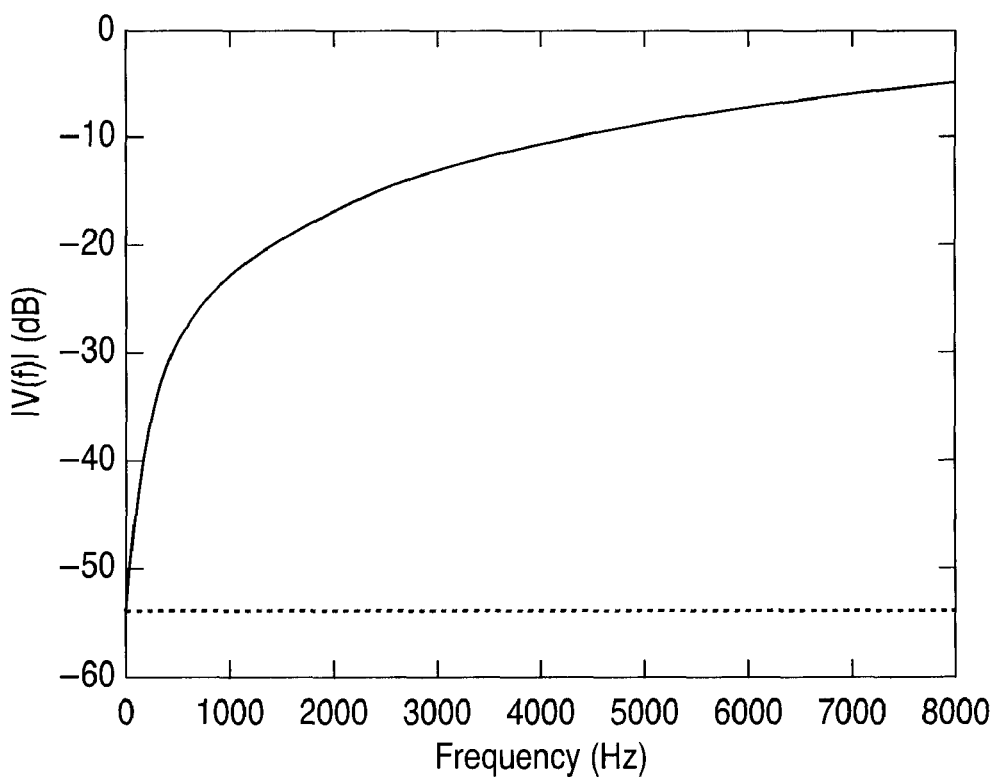
FIG. 2 illustrates a conventional frequency responses for a FOD microphone array and an improved frequency response for a FOD microphone array using signal processing in accordance with the presently claimed invention.

Referring to FIG. 2, the magnitude $|V(f)|$ of the output voltage V(f), as depicted by the solid line plot, displays a high pass characteristic. Such a high pass effect in the conventional CTDMA results from subtraction of both amplitude and phase of the signals. In accordance with the presently claimed invention, the received time domain microphone signals are first transformed to the frequency domain, where signal amplitude and phase are separable and thus can be handled differently. The differential operation is applied only to the amplitudes of the signals, while the phase of the output is set to be the original phase from either one of the two input signals. Although the original phase may be contaminated with noise, it will not significantly affect the subjective quality since the human ear is substantially insensitive to phase distortion. Accordingly, the output voltage can be written as $$V'(f) = \left(\frac{1}{r_1} - \frac{1}{r_2}\right) e^{-jkr_2} \qquad (2)$$

Referring to FIG. 2, the magnitude $|V'(f)|$ of the processed output voltage V(f), as depicted by the dashed line plot, displays a constant gain that is independent of frequency, i.e., the conventional high pass effect is avoided.

Regarding noise reduction performance of a CTDMA in terms of SNR improvement, it can be assumed that there is a virtual microphone at the origin, thereby allowing the input SNR to be defined as $$SNR_{in} = \frac{\sigma_s^2}{\sigma_n^2} \qquad (3)$$

where $\sigma_s^2$ and $\sigma_n^2$ represent the energy of the desired signal and ambient noise, respectively, as received by the virtual microphone.

The output SNR of the differential array can be written as $$SNR_{out} = \frac{\sigma_{s1}^2 - \sigma_{s2}^2}{\sigma_{n1}^2 - \sigma_{n2}^2} \quad (4)$$

where $\sigma^2_{si}$, and $\sigma^2_{ni}$, represent the energy of the desired signal and ambient noise, respectively, as received by the ith microphone.

The improvement in SNR due to the differential array is defined as $$SNR_{diff} = \frac{SNR_{out}}{SNR_{in}} = \frac{\sigma_{s1}^2 - \sigma_{s2}^2}{\sigma_{n1}^2 - \sigma_{n2}^2} \frac{\sigma_n^2}{\sigma_s^2} \quad (5)$$

where $SNR_{diff}$ is a function of the incoming angle of signal, source distance and signal frequency.

Figure 3:
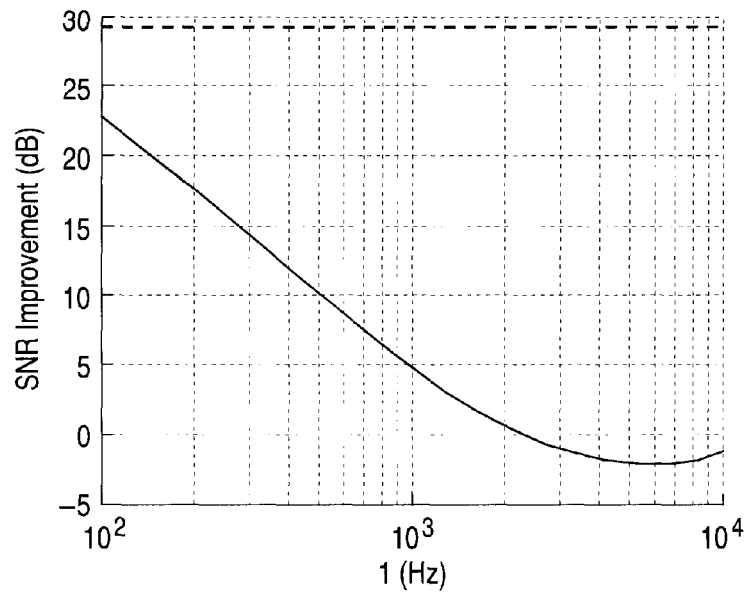
FIG. 3 illustrates a conventional SNR improvement for a FOD microphone array and an improved SNR improvement for a FOD microphone array using signal processing in accordance with the presently claimed invention.

Referring to FIG. 3, based on Equations (1), (2) and (5), the SNR improvement $SNR_{diff}$ as a function of frequency, as depicted by the dashed line plot, is constant over frequency, in contrast to the conventional SNR improvement as depicted by the solid line plot. (This comparison is based on the desired signal being 3 cm away, interference being 1 m away, and both arriving with an angle of incidence of 20 degrees). As can be seen, the SNR improvement in accordance with the presently claimed invention is significantly greater than that of a conventional system, particularly at high frequencies.

Figure 4:
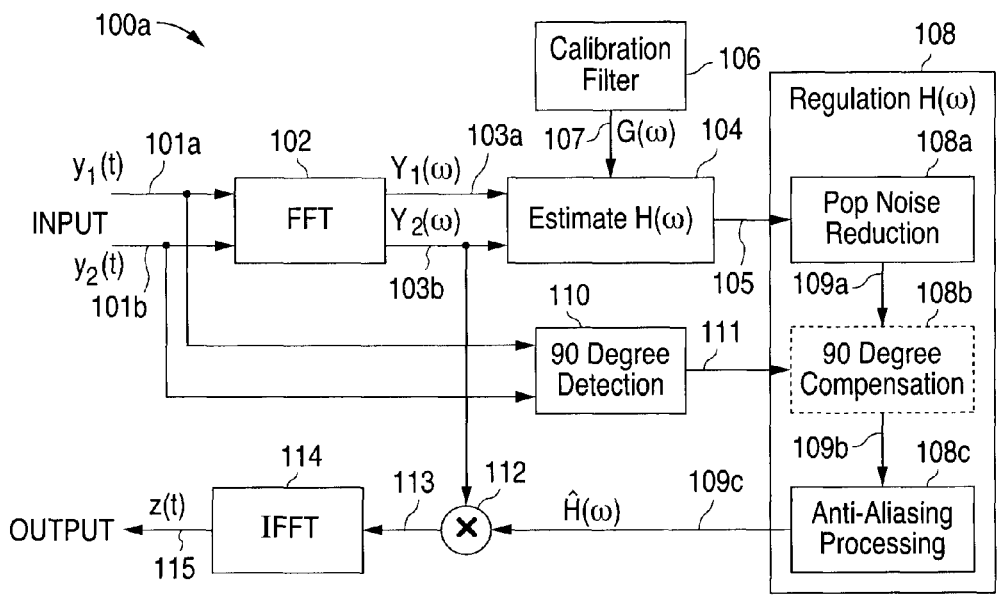
FIG. 4 is a block diagram for a frequency domain signal processor for a CTDMA in accordance with one embodiment of the presently claimed invention.

Referring to FIG. 4, in accordance with one embodiment 100a of the presently claimed invention, a frequency domain signal processor for a CTDMA includes Fast Fourier Transform (FFT) circuitry 102, estimation filter circuitry 104, calibration filter circuitry 106, regulation filter 108, quadrature signal detection circuitry 110, signal mixing circuitry 112, and Inverse Fast Fourier Transform (IFFT) circuitry 114, all interconnected substantially as shown. The incoming time domain signals 101a, 101b, originating from at least two microphones (not shown), are converted to corresponding frequency domain signals 103a, 103b by the FFT circuitry 102 in accordance with well known techniques. As discussed in more detail below, the frequency domain signals 103a, 103b are processed by the estimation filter circuitry 104 to produce a filtered signal 105. The calibration filter 106 contains predetermined filter data 107 which is used by the estimation filter 104 to compensate for differences in frequency responses of the microphones (not shown) responsible for the incoming signals 101a, 101b.

The filtered signal 105 is further processed by the regulation filter circuitry 108 to produce the final processed signal 109c. The incoming filtered signal 105 is processed by pop noise reduction circuitry 108a to reduce signal spikes and pop noise. The resulting processed signal 109a is processed by quadrature signal compensation circuitry 108b using a quadrature signal detection signal 111 provided by the quadrature signal detection circuitry signal 110, which determines when the phase difference between the incoming signals 101a, 101b is within a predetermined range of values above or below 90 degrees. The resulting compensated signal 109b is processed by anti-aliasing processing circuitry 108c to minimize signal aliasing in accordance with well known techniques.

The final processed signal 109c, for which signal phase has been disregarded, has its signal phase re-established by mixing this signal 109c in the signal mixer 112 with one of the two original frequency domain signals, e.g., the second frequency domain signal 103b. The resulting signal 113, now having both magnitude and phase information, is converted back to a time domain signal 115 by the IFFT circuitry 114 in accordance with well known techniques.

Figure 5:
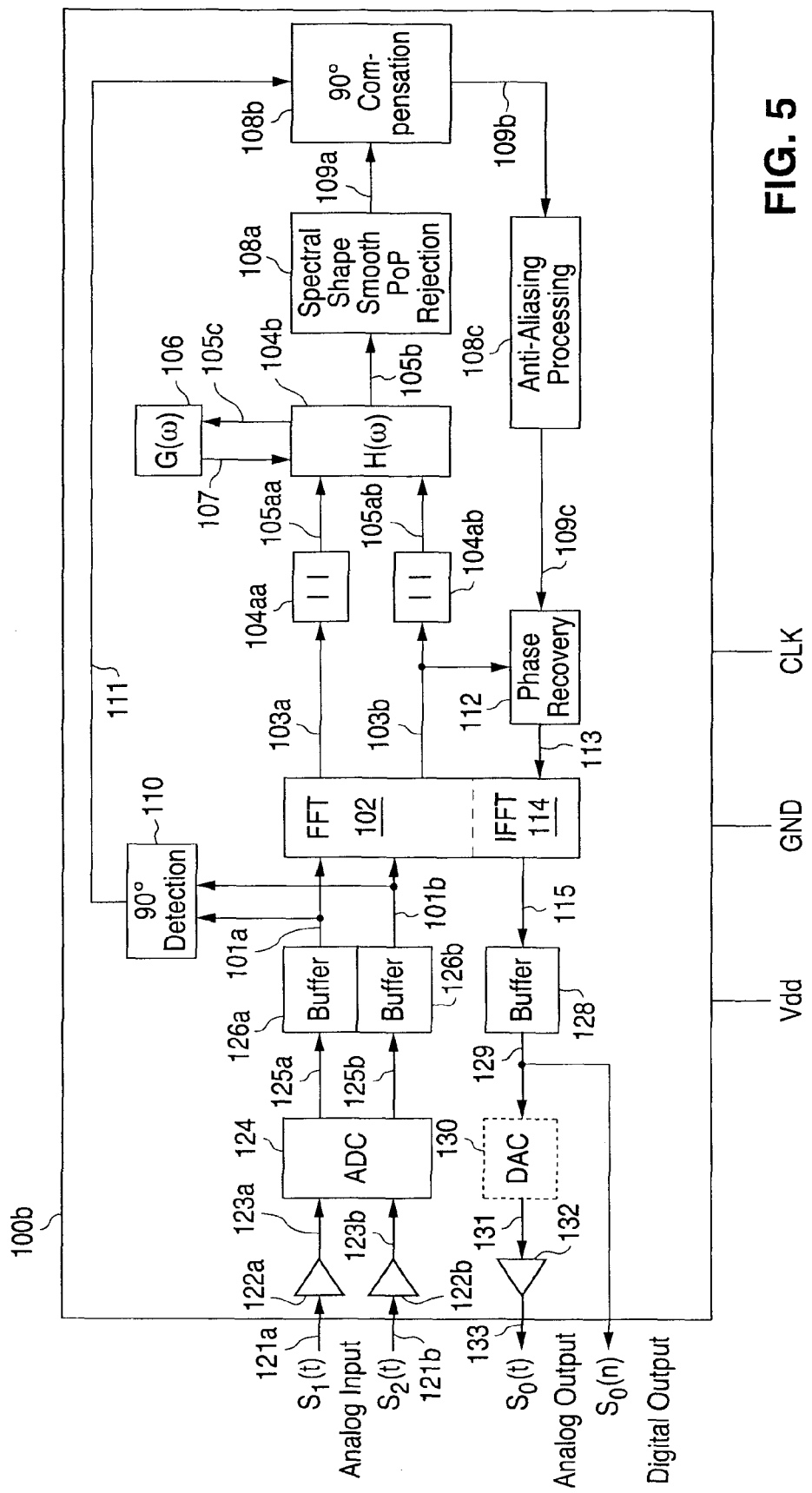
FIG. 5 is a block diagram for a frequency domain signal processor for a CTDMA in accordance with another embodiment of the presently claimed invention.

Referring to FIG. 5, a frequency domain signal processor for a CTDMA in accordance with another embodiment 100b of the presently claimed invention includes elements similar to those of FIG. 4, some of which are shown in greater detail, as well as additional elements. In this embodiment 100b, the estimation filter circuitry 104 includes magnitude detection circuits 104aa, 104ab which detect the magnitudes of the original frequency domain signals 103a, 103b. The detected magnitude signals 105aa, 105ab, as discussed in more detail below, are processed by the filter circuitry 104b using the calibration data 107. In this embodiment, 104b, an intermediate processed signal 105c may be used by the filter circuit 104b as a control signal for the calibration filter circuitry 106.

Analog input signals 121a, 121b, which originate from the microphones (not shown) are amplified by input amplifier circuits 122a, 122b, following which the amplified analog signals 123a, 123b are converted to corresponding digital signals 125a, 125b by analog-to-digital conversion (ADC) circuitry 124. These digital signals 125a, 125b are stored in buffers (e.g., registers) 126a, 126b to be made available as digital time domain signals 101a, 101b used by the FFT circuitry 102 and quadrature signal detection circuitry 110, as discussed above.

The time domain signal 115 generated by the IFFT circuitry 114 is a digital signal and is stored in another buffer 128 to be made available as a digital output signal 129, and to be converted to a corresponding analog signal 131 by digital-to-analog conversion circuitry 130. This analog signal 131 is amplified by an output amplifier circuit 132 to provide an analog output signal 133.

The received time domain digital signals 101a, 101b can be denoted as $y_1(n)$ and $y_2(n)$, where n is the time index. In a real-time application, the received signals 101a, 101b are sequentially processed using short frames. Each short frame of data is transformed from the time domain to the frequency domain using a FFT process 102. The short time spectrums of the resulting frequency domain signals 103a, 103b can be denoted as $Y_1(m, \omega)$ and $Y_2(m, \omega)$, where m is the frame index and $\omega$ is the angular frequency ($2\pi f$). Using Equation (2), the short time spectrum of the output can be expressed as $$Z(m,\omega) = (|Y_1(m,\omega)| - |Y_2(m,\omega)||G(\omega)|) \angle Y_2(m,\omega) \quad (6)$$

where $G(\omega)$ is the frequency response of the calibration filter 106, which compensates for the frequency response differences of the two microphones, and $\angle Y_2(m, \omega)$ denotes the phase of the frequency domain signal 103b $Y_2(m, \omega)$ used later to establish the phase of the frequency domain output signal 113.

By defining the transfer function $H(m, \omega)$ of the estimation filter 104 as $$H(m, \omega) = \frac{|Y_1(m, \omega)| - |Y_2(m, \omega)||G(\omega)|}{|Y_2(m, \omega)|}, \quad (7)$$

Equation (6) can be rewritten as $$Z(m,\omega) = H(m,\omega) Y_2(m,\omega) \quad (8)$$

Hence the output signal is generated by filtering the selected frequency domain signal 103b $Y_2(m, \omega)$ with a real-valued filter 104 $H(m, \omega)$ on a frame-by-frame basis. The filter transfer function $H(m, \omega)$ determines the amount of the signal 103b $Y_2(m, \omega)$ that will remain in the output signal 105.

Given the spacing of the microphone forming the array and the range of the distance of the near-field source, the approximate range of the filter transfer function $H(m, \omega)$ can be estimated using a wave propagation model. For example, if the array spacing is 2 cm and the near-field source is within 1-6 cm, the magnitude $|H(m, \omega)|$ of the filter transfer function $H(m, \omega)$ should be in the approximate range of 0.25-2.0. With improved or more specific knowledge of the proper range of the filter transfer function $H(m, \omega)$, further improvements to the quality of the output signal can be realized.

Regarding signal spikes and pop noise, the value of the magnitude $|H(m, \omega)|$ of the filter transfer function $H(m, \omega)$ calculated from Equation (7) can sometimes exceed the range predicted by the wave propagation model due to random fluctuations in the magnitudes $|Y_i(m,\omega)|$ of the short time spectrums $Y_i(m, \omega)$. For example, the magnitude $|Y_2(m, \omega)|$ of the selected frequency domain signal 103b $Y_2(m, \omega)$ can be very small and result in a large filter transfer function magnitude $|H(m, \omega)|$. In such a case, large spikes can appear in the output signal 105 and may cause overflow in a fixed-point algorithm.

One effective way to avoid undesirable spikes is to limit the filter transfer function magnitude $|H(m, \omega)|$ below the maximum value predicted by the wave propagation model. This has been found to not only reduce signal spikes but also significantly reduce pop noise.

Pop noise is highly non-stationary and has a spectrum similar to that of white noise. This too can result in a large filter transfer function magnitude $|H(m, \omega)|$ and eventually generate audible pop noise in the output. It can be very difficult to handle in a conventional CTDMA because the high frequency components of the pop noise tend to be amplified. Hence, with a conventional CTDMA extra acoustic design considerations become necessary to minimize pop noise.

In accordance with the presently claimed invention, the highly non-stationary spectrum of pop noise can be compensated by limiting the maximum value of the filter transfer function magnitude $|H(m, \omega)|$. This advantageously allows the acoustic design requirements to be less demanding.

Regarding quadrature signal cancellation, when the received signal is dominated by either far-field interference or a near-field signal arriving at an angle of near 90 degrees relative to the desired signal, the magnitudes $|Y_1(m, \omega)|$, $|Y_2(m, \omega)|$ of the short time spectrums of the frequency domain signals 103a $Y_1(m, \omega)$, 103b $Y_2(m, \omega)$ tend to be approximately equal, thereby producing a small value for the filter transfer function magnitude $|H(m, \omega)|$. In the case of dominating far-field interference, the filter transfer function magnitude $|H(m, \omega)|$ should be allowed to approach zero so as to achieve maximum far-field interference reduction. However, in the case of a dominating near-field signal, the received signal is dominated by desired signals in the near-field, so allowing the filter transfer function magnitude $|H(m, \omega)|$ to become zero will cancel out most desired signals. To prevent excessive cancellation of a desired signal, a lower limit can be put on the filter transfer function magnitude $|H(m, \omega)|$. While setting this lower limit can result in less interference being reduced, such a lower limit can be designed to become activated only upon detection of a signal approaching from a near-field source with an angle of incidence near 90 degrees.

Regarding anti-alias processing, since the received signal is processed sequentially in short frames, overlap-add processing is performed in accordance with well known techniques (see, e.g., U.S. Pat. No. 6,173,255, the disclosure of which is incorporated herein by reference). Measures can also be taken to avoid aliasing caused by short frame processing in the frequency domain.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a frequency domain signal processor for a close talking differential microphone array with a plurality of microphones, comprising:

time-to-frequency domain conversion circuitry responsive to a plurality of time domain microphone signals originating from said plurality of microphones, each with a corresponding magnitude and phase, by providing a corresponding plurality of frequency domain microphone signals with respective magnitudes and phases;

filter and processing circuitry including signal magnitude detection circuitry, compensation filter circuitry and signal spectrum shaping circuitry;

said signal magnitude detection circuitry being responsive to said plurality of frequency domain microphone signals by providing a corresponding plurality of frequency domain magnitude signals each of which is indicative of a respective one of said plurality of frequency domain microphone signal magnitudes;

said compensation filter circuitry being configured to provide at least one compensation signal related to a difference in frequency response characteristics of respective ones of said plurality of microphones; and said signal spectrum shaping circuitry being responsive to said plurality of frequency domain magnitude signals and said at least one compensation signal by providing a frequency domain processed signal;

phase recovery circuitry responsive to at least one of said frequency domain microphone signals and to said frequency domain processed signal by providing a frequency domain resultant signal having a phase related to said at least one frequency domain microphone signal; and frequency-to-time domain conversion circuitry responsive to said frequency domain resultant signal by providing a corresponding time domain resultant signal related to a combination of said time domain microphone signals.

2. The apparatus of claim 1, wherein said time-to-frequency domain conversion circuitry comprises Fast Fourier Transform (FFT) circuitry.

3. The apparatus of claim 1, further comprising analog-to-digital conversion (ADC) circuitry coupled to said time-to-frequency domain conversion circuitry to convert a plurality of analog microphone signals to a plurality of corresponding digital microphone signals as said plurality of time domain microphone signals.

4. The apparatus of claim 1,
wherein said filter and processing circuitry further comprises anti-aliasing processing circuitry;
wherein said signal spectrum shaping circuitry is responsive to said plurality of frequency domain magnitude signals and said at least one compensation signal by providing a frequency domain filtered signal corresponding to said combination of said plurality of frequency domain microphone signal magnitudes; and wherein said anti-aliasing processing circuitry is responsive to said frequency domain filtered signal by providing said frequency domain processed signal.

5. The apparatus of claim 1 further comprising:

quadrature phase detection circuitry responsive to said plurality of time domain microphone signals by providing a phase signal indicative of a phase difference between at least two of said time domain microphone signal phases, and wherein said filter and processing circuitry is responsive to said frequency domain microphone signals and said phase signal such that said frequency domain processed signal is related to:

a first combination of said plurality of frequency domain microphone signal magnitudes when said phase difference is within a predetermined proximity to 90 degrees; and a second combination of said plurality of frequency domain microphone signal magnitudes when said phase difference is not within said predetermined proximity to 90 degrees.

6. The apparatus of claim 1, wherein said phase recovery circuitry comprises signal mixing circuitry.

7. The apparatus of claim 1, wherein said frequency-to-time domain conversion circuitry comprises Inverse Fast Fourier Transform (IFFT) circuitry.

8. The apparatus of claim 1, wherein said time domain resultant signal is a digital signal, and further comprising digital-to-analog conversion (DAC) circuitry coupled to said frequency-to-time domain conversion circuitry to convert said digital time domain resultant signal to an analog signal.

9. An apparatus including a frequency domain signal processor for a close talking differential microphone array with a plurality of microphones, comprising:

time-to-frequency domain conversion circuitry responsive to a plurality of time domain microphone signals originating from said plurality of microphones, each with a corresponding magnitude and phase, by providing a corresponding plurality of frequency domain microphone signals with respective magnitudes and phases;

quadrature phase detection circuitry responsive to said plurality of time domain microphone signals by providing a phase signal indicative of a phase difference between at least two of said time domain microphone signal phases, filter and processing circuitry responsive to said frequency domain microphone signals and said phase signal by providing a frequency domain processed signal, and wherein said frequency domain processed signal is related to:

a first combination of said plurality of frequency domain microphone signal magnitudes when said phase difference is within a predetermined proximity to 90 degrees; and a second combination of said plurality of frequency domain microphone signal magnitudes when said phase difference is not within said predetermined proximity to 90 degrees;

phase recovery circuitry responsive to at least one of said frequency domain microphone signals and to said frequency domain processed signal by providing a frequency domain resultant signal having a phase related to said at least one frequency domain microphone signal; and frequency-to-time domain conversion circuitry responsive to said frequency domain resultant signal by providing a corresponding time domain resultant signal related to a combination of said time domain microphone signals.

10. The apparatus of claim 9, wherein said filter and processing circuitry comprises:

signal magnitude detection circuitry responsive to said plurality of frequency domain microphone signals by providing a corresponding plurality of frequency domain magnitude signals each of which is indicative of a respective one of said plurality of frequency domain microphone signal magnitudes; and signal spectrum shaping circuitry coupled to said signal magnitude detection circuitry and responsive to said plurality of frequency domain magnitude signals by providing said frequency domain processed signal.

11. The apparatus of claim 10, wherein said filter and processing circuitry further comprises:

compensation filter circuitry configured to provide at least one compensation signal related to a difference in frequency response characteristics of respective ones of said plurality of microphones;

said signal spectrum shaping circuitry being responsive to said plurality of frequency domain magnitude signals and said at least one compensation signal by providing said frequency domain processed signal.

12. The apparatus of claim 10, wherein said filter and processing circuitry further comprises:

anti-aliasing processing circuitry;

said signal spectrum shaping circuitry being responsive to said plurality of frequency domain magnitude signals by providing a frequency domain filtered signal corresponding to said combination of said plurality of frequency domain microphone signal magnitudes; and said anti-aliasing processing circuitry being responsive to said frequency domain filtered signal by providing said frequency domain processed signal.

13. The apparatus of claim 10, wherein said filter and processing circuitry further comprises:

compensation filter circuitry configured to provide at least one compensation signal related to a difference in frequency response characteristics of respective ones of said plurality of microphones; and anti-aliasing processing circuitry;

said signal spectrum shaping circuitry being responsive to said plurality of frequency domain magnitude signals and said at least one compensation signal by providing a frequency domain filtered signal corresponding to said combination of said frequency domain microphone signal magnitudes; and said anti-aliasing processing circuitry being responsive to said frequency domain filtered signal by providing said frequency domain processed signal.

14. The apparatus of claim 9, wherein said time-to-frequency domain conversion circuitry comprises Fast Fourier Transform (FFT) circuitry.

15. The apparatus of claim 9, further comprising analog-to-digital conversion (ADC) circuitry coupled to said time-to-frequency domain conversion circuitry to convert a plurality of analog microphone signals to a plurality of corresponding digital microphone signals as said plurality of time domain microphone signals.

16. The apparatus of claim 9, wherein said phase recovery circuitry comprises signal mixing circuitry.

17. The apparatus of claim 9, wherein said frequency-to-time domain conversion circuitry comprises Inverse Fast Fourier Transform (IFFT) circuitry.

18. The apparatus of claim 9, wherein said time domain resultant signal is a digital signal, and further comprising digital-to-analog conversion (DAC) circuitry coupled to said frequency-to-time domain conversion circuitry to convert said digital time domain resultant signal to an analog signal.

* * * * *